March 10, 1925.  1,528,869
C. BARBIERI
INDICATING DEVICE
Filed Sept. 10, 1921 4 Sheets-Sheet 1
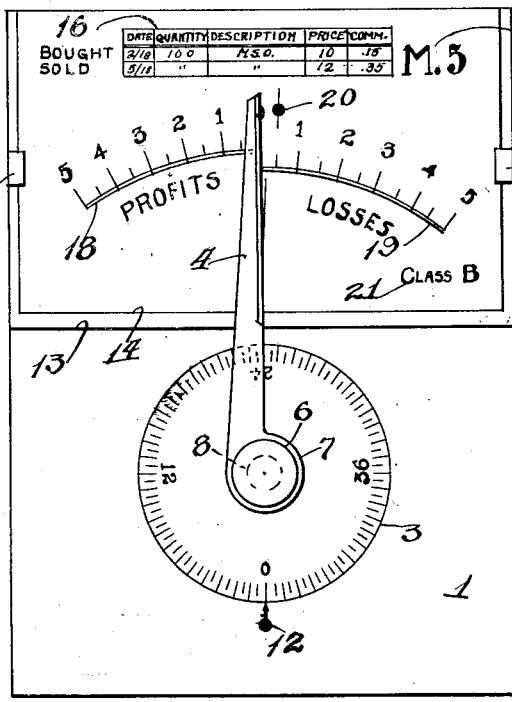
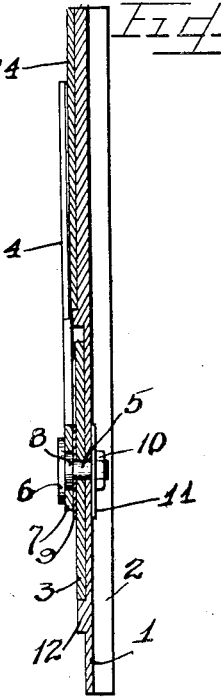
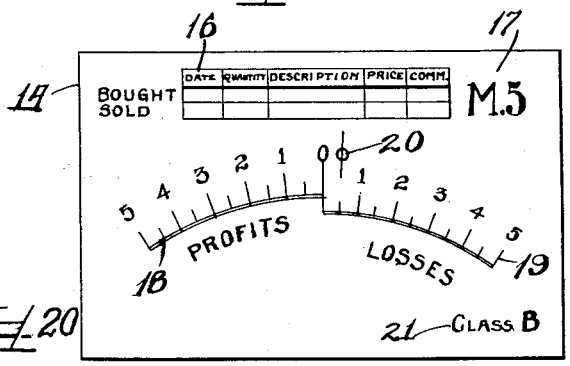
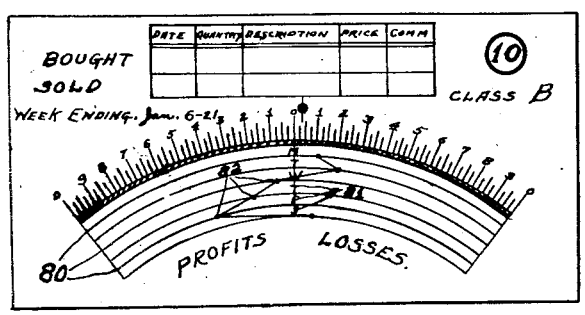
INVENTOR
Cesare Barbieri
BY
Charles W. Hills
ATTORNEY

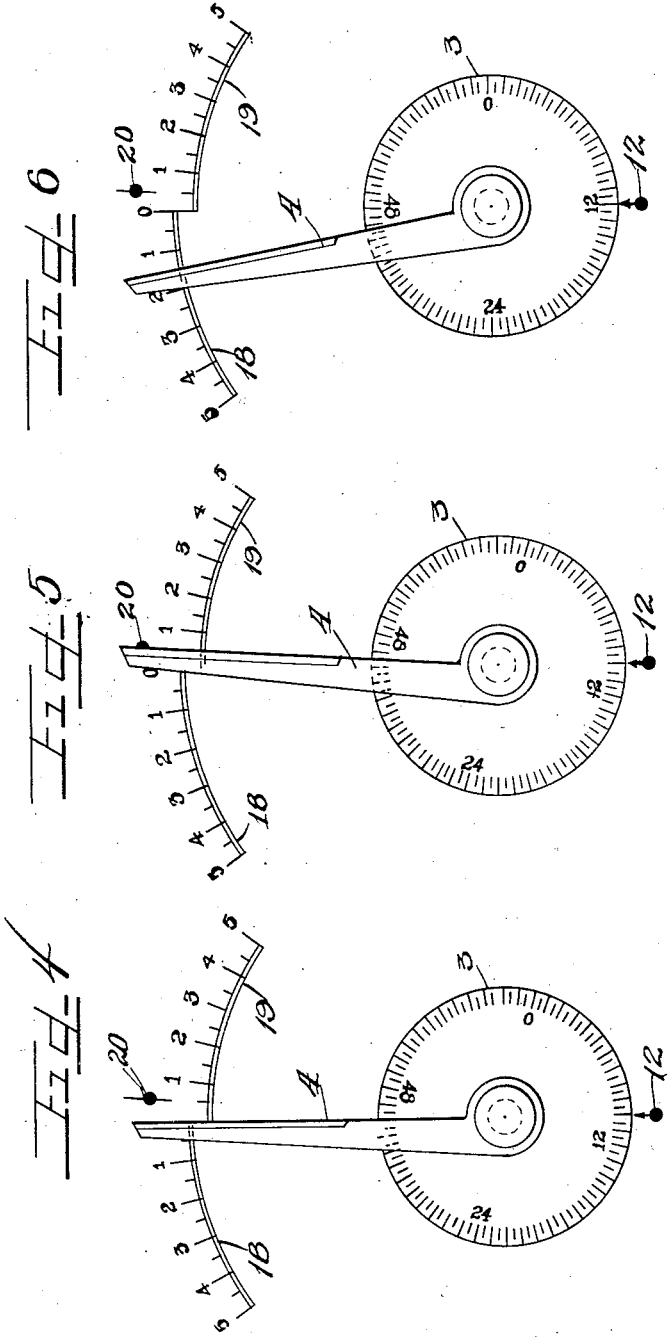

March 10, 1925. 1,528,869
C. BARBIERI
INDICATING DEVICE
Filed Sept. 10, 1921 4 Sheets-Sheet 3
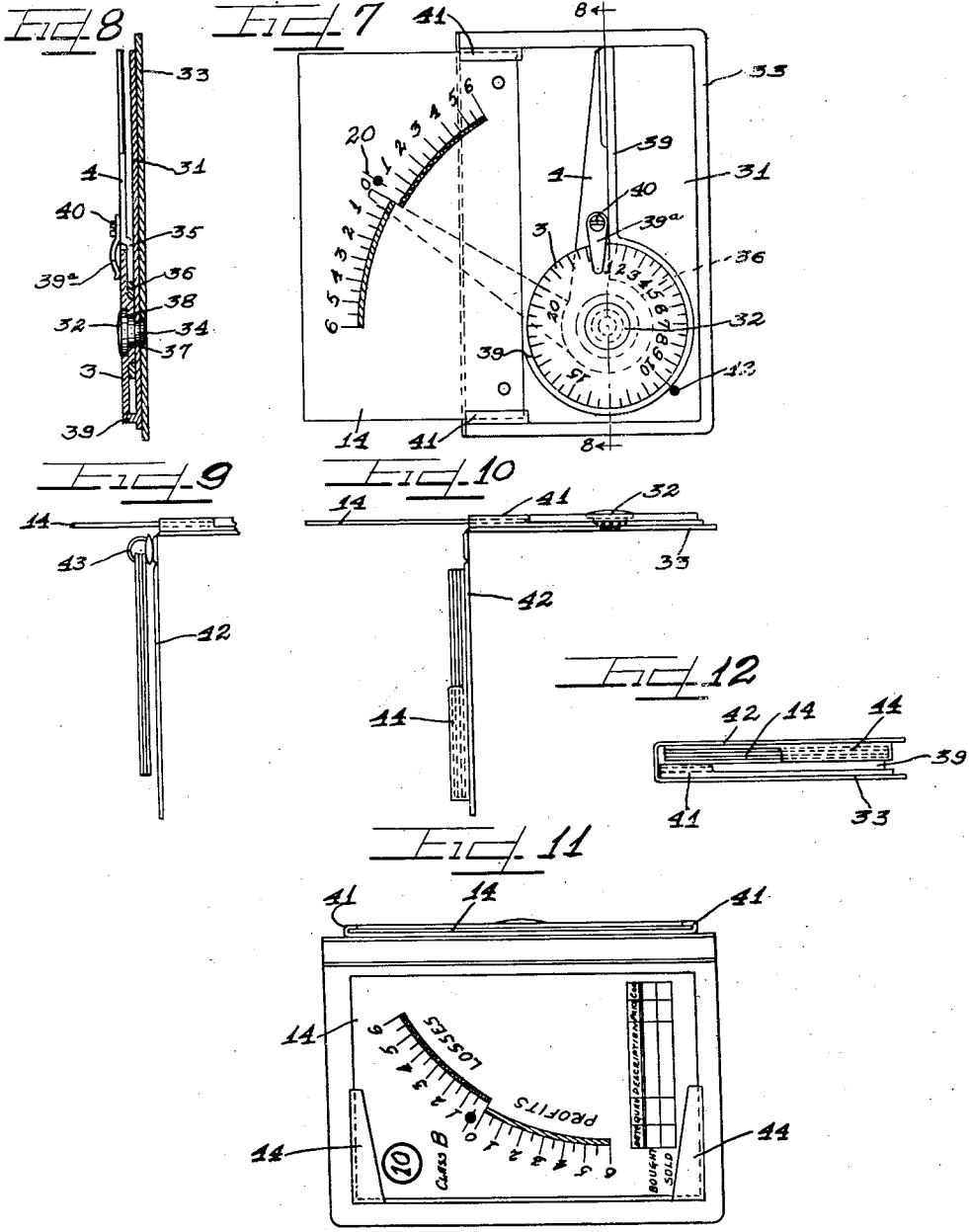
INVENTOR
Cesare Barbieri
BY
ATTORNEY March 10, 1925.  
C. BARBIERI  
INDICATING DEVICE  
Filed Sept. 10, 1921  
1,528,869  
4 Sheets-Sheet 4
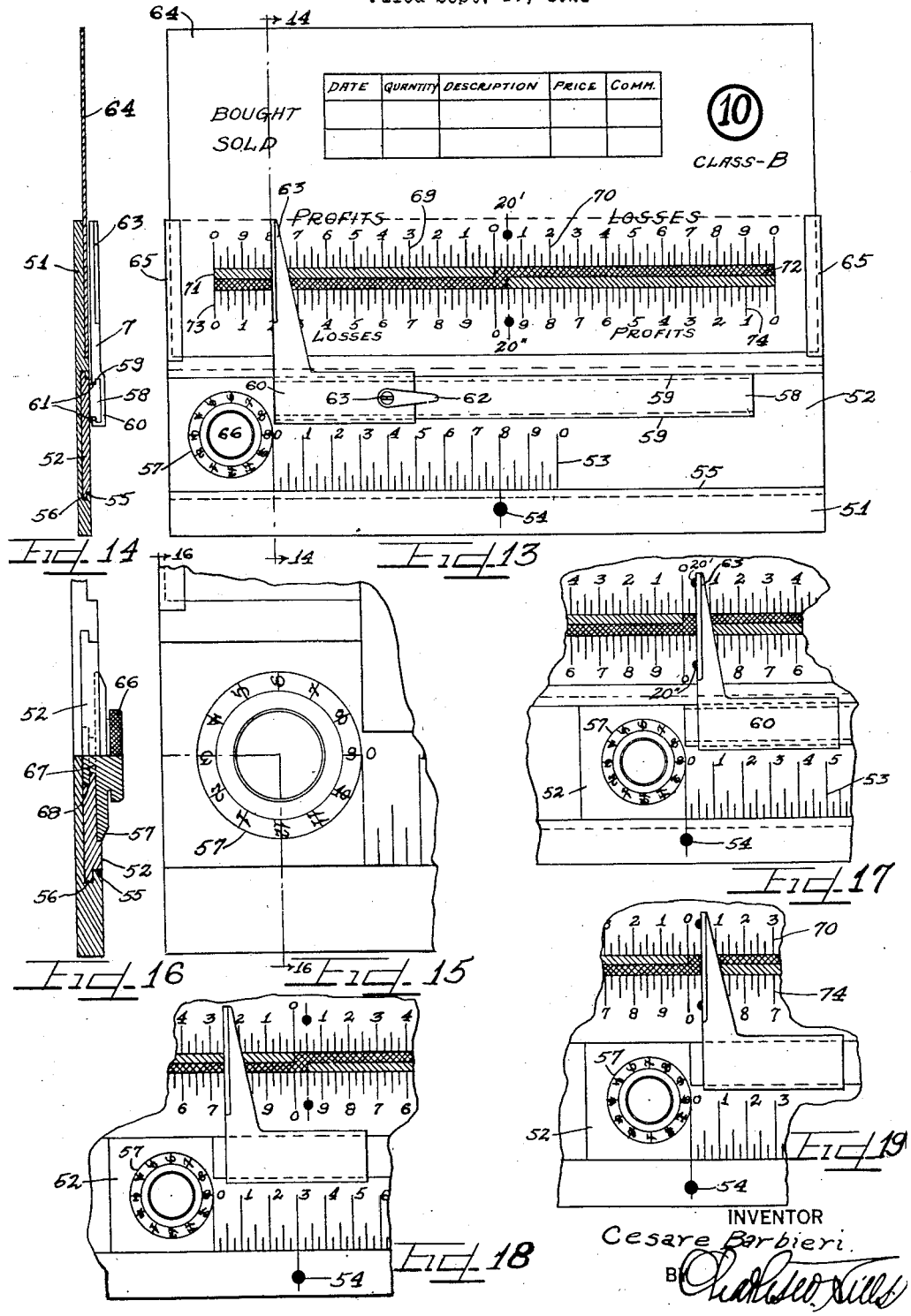
INVENTOR  
Cesare Barbieri  
BY  
ATTORNEY Patented Mar. 10, 1925.

UNITED STATES PATENT OFFICE.

CESARE BARBIERI, OF NEW YORK, N. Y.

INDICATING DEVICE.

Application filed September 10, 1921. Serial No. 499,613.

*To all whom it may concern:*

Be it known that I, CESARE BARBIERI, a subject of the King of Italy, and a resident of the city of New York, in the county of New York and State of New York, have invented certain new and useful Improvements in an Indicating Device; and I do hereby declare that the following is a full, clear, and exact description of the same, reference being had to the accompanying drawings, and to the numerals of reference marked thereon, which form a part of this specification.

This invention relates to a device for use in computing the profits or losses concerning purchase or sale of stocks through a broker.

It is an object of this invention to provide a means for indicating the profits or loss of the customer without the necessity of computation.

It is a further object of this invention to provide a device which may be used with different cards to show the profit or loss under the conditions presented by each of said cards respectively.

It is a further object of this invention to provide a device of the kind indicated which shall have suitable dimensions to enable it to be made a part of a pocket memorandum book or to be made an article of desk equipment.

It is a further object of this invention to provide a computing device having two stationary scales and a movable one and to furnish the movable scale with a pointer that ordinarily will travel with it but can be moved relatively to the moving scale. The invention contemplates furnishing a stationary scale with a reference mark indicating the place thereon to which the pointer should be brought when it is moved relative to the movable scale, but such a reference mark, while an added convenience, is not necessary for the practice of my invention.

Other and further important objects of this invention will be apparent from the disclosures in the specification and the accompanying drawings.

The invention (in a preferred form) is illustrated in the drawings and hereinafter more fully described.

On the drawings:

Figure 1 is a front view of one form of the device with a card inserted therein.

Figure 2 is a vertical central section of the same.

Figure 3 is a view of the card.

Figure 4 shows the device in the position corresponding to the first step of making the computation.

Figure 5 shows the device in a position corresponding to the second step of the computation.

Figure 6 shows the device in a position corresponding to a completed computation.

Figure 7 is a plan view of a modified form.

Figure 8 is a section on the line 8—8 of Figure 7.

Figure 9 is a fragmentary end view of the form shown in Figure 7.

Figure 10 is an end view of a further modification.

Figure 11 is a side view looking from the left of Figure 10.

Figure 12 is an end view showing the modification illustrated in Figure 10 when the same is closed.

Figure 13 is a plan of another modification.

Figure 14 is a section on the line 14—14 of Figure 13.

Figure 15 is an enlarged view of a portion of Figure 13 showing the sliding member.

Figure 16 is an end view of Figure 15, the lower part being a section on the line 16—16 of Figure 15.

Figure 17 is a view of a portion of Figure 13 showing the position corresponding to one stage of the computation.

Figure 18 is the same showing a final stage of this computation.

Figure 19 shows the final stage of a different computation.

Figure 20 shows a modified form of card.

As shown on the drawings:

The device is mounted upon a base 1. This may be of any suitable material. If the device is to be used as an article of desk equipment, the base is preferably of metal and provided with flanges 2. It may, however, be made of stiff cardboard and without flanges if desired. Rotatably mounted in the base in any suitable manner is a dial 3 and mounted concentrically therewith is a pointer 4. In the particular form of mounting shown, the pointer and dial are secured by a bolt 5 having a head 6 big enough to cover the opening in the hub 7 of the pointer. The bolt may have an enlargement 8 to afford a better bearing for this hub. Between the hub 7 and the dial 3 is a spring washer 9 which affords sufficient friction to insure that the dial and pointer will move together except when an intentional relative motion is produced. The end of the bolt 5 extends through base 1 and is fastened by a nut 10. A washer 11 is provided to afford a good bearing for this nut. The foregoing detail description of the mounting of the dial and pointer is not to be regarded as excluding other forms of mounting. An essential feature is that the two shall be capable of rotation relative to the base 1 and shall not rotate relative to one another easily enough to make accidental displacement of the pointer relative to the dial likely.

Upon the base 1 is a reference mark 12 which cooperates with the numbering of the dial to enable the operator to definitely position the same. As illustrated, this reference character is made by striking up or otherwise producing a raised portion of the surface of the base 1. It is, however, obvious that when a thinner structure is desired, this character may be painted or printed upon the base 1 without departing from the spirit of my invention.

The portion of the base above the dial is furnished with a frame 13 to hold a card 14. The card is further secured in place by means of two clips or retainers 15. Upon the card is printed a table 16 having suitably designated columns and lines for a record of the transactions. In the upper right-hand corner of the card is a designation 17 indicating the size of margin upon which the transaction is conducted. In the specific case illustrated, this designation is M. 5 to indicate that the transaction is covered by a margin of 5 points.

The card also bears two arcuate scales 18 and 19. The numbering on these scales extends from zero to a number equal to the margin indicated at 17. The zero of the two scales is at their adjacent ends but the scales are offset from one another to prevent one being confused with the other. To further prevent this, one scale is printed in a different color from the other. For example, the left-hand scale may be printed in black and the right-hand scale in red. Adjacent the left-hand scale is printed the word "Profits" and adjacent the right-hand scale is printed the word "Losses." The size of the divisions upon the "losses" scale is somewhat smaller because this scale is slightly nearer the center. Both scales are curvilinear, the common center of the two being at the center of rotation for the pointer and dial. If desired, the scales may have a border line printed in the same color as the scales and wide enough to be more conspicuous than the color of the scale itself.

Adjacent the "losses" scale and near the zero end thereof is a mark 20. This mark is placed opposite a division or subdivision upon the "losses" scale which will correspond to the broker's charges. In the lower right-hand corner of the card is printed an indication of the classification. For example: In the illustrated card, the words "Class B" at 21 are this indication. The position of the mark 20 is determined by the classification of the transaction to which the card pertains. For example: If the brokerage charge is great, the reference mark 20 will be further to the right; if the classification is such that the brokerage charge is small, the reference character 20 will be further to the left. In the illustration chosen, Class B is a class of stocks upon which the broker is entitled to charge $15.00 per hundred shares. The complete transaction would include as broker's charges therefor 15¢ for the purchase of one share, 15¢ for the sale of one share and 20¢ for taxes, making a total of 50¢. This is represented by one-half of one division upon the "losses" scale and the mark 20 is therefore opposite the first half-division mark.

In the use of this apparatus, a card is selected whose classification and marking correspond to the transactions which the client proposes, and in the table 16, a record of the client's orders is made. The numerals on the dial 3 stand for points of price of the stock in question. In the illustration chosen, the numerals run from zero to forty-eight and this dial could be used for stock whose price is reckoned in eighths of a point and whose variation in price is not likely to exceed six points. It is, however, obvious that a dial graduated in any other manner may be used.

In the use of this device, a card is inserted as illustrated in Figure 1 and the dial 3 is turned until the reference character 12 indicates the price at which the stock has been ordered bought. The pointer 4 is moved to the zero of the scales 18 and 19 without disturbing the dial. When the broker has rendered the client service by buying or selling the stock, or both, the pointer 4 is moved to indicate the broker's charges still without moving the dial. In the illustration given in Figure 5, it is assumed that the broker has first bought the stock and then sold it so that as in the illustration cited above, his charges are one-half of a point. The pointer 4 is therefore moved to the reference mark 20. Since this is the commonest transaction arising, the reference character 20 marks the place to which the pointer would most frequently be moved. If the stock were sold at a different price from that at which it was bought, the dial 3 is next moved accordingly and the pointer 4 travels with it. Thus, in the illustration shown in Figure 6, it is assumed that the stock which was bought at 10 has been sold at 12. The pointer 4 therefore rests at 1½ having been first moved to the reference character 20 which is the point one-half on the "losses" scale and then having traveled with the dial 3 to the final point which is two full graduations to the left of the point 20.

It is apparent from this illustration that in the use of the device, no computation is necessary, but the pointer is moved mechanically to the right an amount equal to the broker's charges and the dial 3 is moved mechanically first to a point representing the buying price and then to a point representing the selling price. The final position of the pointer after the manipulation enables the operator to read the profit or loss at once and no computation is needed to determine this figure.

In the form of the device shown in Figures 7 and 8, the dial 3 is rotatably mounted upon a base 31 by means of a rivet 32 inserted through the base 31 and headed up on the other side thereof. This side is covered by a member 33 of a pair of book covers and the upset end of the rivet 34 is concealed by this member of the pair of book covers. In this form, the dial 3 and the pointer 4 are in the same plane, the hub of the pointer being displaced from this plane as indicated at 35 in order that the hub 36 may be beneath the dial 3. If desired, the enlargement 37 upon the rivet may be separated from the hub 36 by a filler collar 38. A neat appearance is given to the inner face of the device by making a portion of the base 31 thick enough to reach to the upper surface of the dial as indicated at 39.

The pointer 4 has secured to it just outside of the bend 35 a spring 39ª. As shown, this spring is secured to the pointer 4 by means of a screw 40 but it is obvious that any method of securing the spring may be employed. The base plate 31 is provided with two guides or pockets 41 to receive the card 14. The inner ends of these pockets, that is, the ends at the right in Figure 7, are each provided with an end wall to serve as a stop to positively position the card in the position illustrated. The card used may be of the form shown in Figure 3 but I prefer to rearrange the matter thereon as illustrated in Figures 7 and 11 in order to make a card of a better shape for use in a pocket device.

As shown in Figure 9, the other member of the pair of covers 42 is connected to the first member 33 by the ordinary temporary binding, which is provided with the usual split rings 43 upon which are secured any number of cards 14 which may be used in connection with the computing device by removing one card 14 from the guide 41 and another card 14 from the rings 43 and interchanging the two.

In the form shown in Figure 10 instead of a temporary binder, the second member 42 of the pair of covers is provided with a guide 44 upon its outer edge. This guide serves to hold a plurality of cards 14 any one of which may be inserted in the guides 41 to cooperate with the computing device. As shown in Figure 12, the form illustrated in Figure 11 will, when folded, bring the whole device into a compact shape so that it is readily carried in the pocket. Although it is not illustrated, it is obvious that the form shown in Figures 7 to 9 will also fold into a similar compact form.

In the form of device shown in Figures 13 to 19, I have replaced the rotating dial by a sliding part and the arcuate scales upon the card are replaced by straight scales. In this form, there is a base 51 in which is slidably mounted a piece 52 carrying a scale 53. The lower edge of the base 51 is provided with a reference mark 54 to cooperate with the scale 53. The line through this reference mark is carried to the edge of the lip 55 which cooperates with an extension 56 upon the end of the slide to hold the same against the base. As shown in Figure 14, a similar lip upon the base and a similar extension upon the slide are provided at the upper edge of the slide.

There is also mounted upon the slide a dial 57 and the row of figures adjacent the rulings of the scale 53 affords a reference mark for this dial. When rotated, the dial indicates the left-hand digit or digits for a number, and the digits upon the scale 53 give the right-hand digit.

Integral with the slide 52 is a ridge 58 having overhanging projections 59 upon which is slidably mounted a runner 60, with inwardly projecting lips 61 to cooperate with the overhanging edges of the ridge 58. The runner 60 has secured thereto a spring 62 by means of a screw 63. The spring bears against the upper surface of the ridge 58 and so affords sufficient friction to insure that the runner 60 will move with the slide 52 except when intentionally displaced relative thereto.

Integral with the runner 60 is a pointer 63′ which rides over a card 64 held in guide pockets 65 similar to the pockets 41 already described. The dial 57 is operated by means of a milled head 66 best shown in Figure 16. This figure also shows that the dial may be mounted upon a pivot which extends through the slide 52, if desired, as shown at 67. When this is done, the under side of the slide 52 will be recessed as shown at 68 to afford space for the upset end of the pivot 67.

The card 64 contains the same designations and tables as the card 14 already described. It also contains scales 69 and 70 analogous to the scales already explained in connection with the card 14. These scales, however, are straight because they are traversed by a sliding instead of a rotating pointer. The scale marked "Profits" 69 is preferably printed in black and the scale marked "Losses" 70 is preferably printed in red. If desired, there may be additional emphasis given to this difference by providing each scale with a wide border line 71, 72, in the same color that the scale itself is printed. The card 64 also bears another pair of scales, 73, 74, the numbers of which run in the opposite directions from those of the first-named pair of scales. These are used when there is occasion to change the dial 57 because the left-hand digit in the buying or selling price has changed. Two reference marks 20' and 20'' are placed near these scales to serve the same purpose as the mark 20 shown in Figures 1 and 7.

In the use of this form of the device, the scales 69 and 70 cooperate with the pointer in a way which will be wholly clear from the foregoing description of the operation of the form of the device shown in Figure 1. Assuming that the customer bought stocks at 90 points, the dial 57 will be placed so that the digit 9 is opposite the row of digits on the scale 53, and the slide 52 will be placed so that the zero mark will stand opposite the index point 54. When the broker has bought and sold for the customer the rider 60 may be moved so that the pointer 63 will stand at the index mark 20'. If the customer should sell at the same price at which he bought, the result would be a loss equal to the broker's charges as is indicated by Figure 17. If the customer were to sell at 93 or 94, the slide 52 in Figure 17 would be moved to the left a corresponding distance of three or four steps. The pointer 63 would then point to a corresponding profit as explained in connection with Figure 1 and shown in Figure 18. If the customer having bought at 90 were to sell at 100, the slide 52 would not be moved from the position indicated in Figure 17 but the dial 57 would be turned one notch counter-clockwise as shown in Figure 19. When this is done, the lower scale 74 instead of the upper scale 70 is used and the device indicates a profit of 9½ points.

Figure 20 illustrates a modified form of card for use with those forms of the device shown in Figure 1 and Figure 7. In addition to the arcuate scales 18 and 19, a series of concentric lines 80 is present, each of which is indicated by a letter 81 to indicate the days of the week. The daily fluctuation of the stock may be indicated by marking upon each of these lines the corresponding position of the pointer and therefore of the customer's profits or losses, as indicated at 82. If desired, the course of fluctuations of the stocks may be made more manifest by connecting the several points 82 with a broken line as shown upon the drawing.

I am aware that numerous details of construction may be varied through a wide range without departing from the principles of this invention, and I therefore do not purpose limiting the patent granted otherwise than necessitated by the prior art.

I claim as my invention:

1. In a computing device, a base, a dial mounted on said base, a pointer mounted thereon concentric with said dial, means on said base for securing a card in position to co-operate with said pointer, in combination with a card having scales with a common zero point thereon and a reference mark positioned to one side of said zero point.

2. A card having thereon two arcuate scales with a common center and different radii, the zero points of the two scales being at adjacent ends thereof, and the maximum point of said scales being alike, said card also having an indication corresponding to the maximum reading of said scale.

3. A card having thereon two scales, the zero point of said scales being at adjacent ends thereof, and the maximum points of said scales being at the distal ends thereof, said card also having a reference mark adjacent one of said scales at a distance from its zero end and also having a classification mark corresponding to the distance of said reference mark from the zero end of its scale.

4. In a computing device, a base, a scale movably mounted thereon, a pointer mounted on said scale, and means on said base for securing a card in position to co-operate with said pointer, in combination with a card held in place by said means and having profit and loss scales thereon with the zero ends adjacent one another, said card also having a reference mark, and a classification mark thereon.

In testimony whereof I have hereunto subscribed my name in the presence of two subscribing witnesses.

CESARE BARBIERI.

Witnesses:
FRANCIS A. REDDALL,
THOMAS E. MCELRAEVY.